3,328,406
AMIDE AND PIPERAZIDES OF CARBAZOLE-9-GLYOXYLIC ACID
Milton Wolf, West Chester, and Francis J. Greek, Philadelphia, Pa., assignors to American Home Products Corporation, New York, N.Y., a corporation of Delaware
No Drawing. Filed Feb. 18, 1965, Ser. No. 433,778
4 Claims. (Cl. 260—268)

This invention is concerned with carbazole-9-glyoxylic acid derivatives which have significant therapeutic activity.

As determined by standard pharmacological procedures with warm-blooded animals, the compounds disclosed herein exhibit central nervous system depressant activity, mydriatic activity and diuretic activity.

The herein disclosed compounds have the formula:

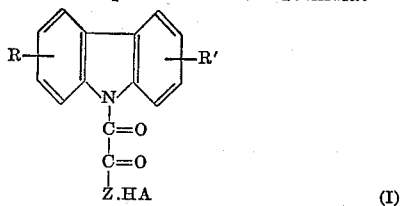

(I)

In the preferred compounds of the invention, substituents R and R' are both hydrogen; A is chlorine; Z represents the groups:

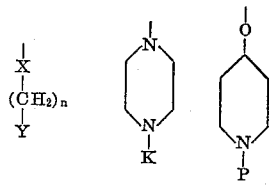

where K is methyl or phenyl; P is methyl; X is imino; Y is dimethyl-amino; and $n$ is 2.

For the purposes of this invention it should be noted that equivalent substituents for substituents R and R' in the above formula include (lower)alkyl, benzyl, phenyl, halophenyl, (lower)alkoxyphenyl, (lower)alkylphenyl, nitrophenyl, halogen, (lower)alkoxy, (lower)alkylthio, sulfamyl, (lower)carboalkoxy, (lower)alkanoyl, (lower) alkanoylamino, halo(lower)alkyl except dichloromethyl, cyano and nitro groups. As defined herein, the lower hydrocarbon chains are intended to contain from 1 to 4 carbon atoms therein. In the case of the aromatic substituents, such as halophenyl, the substituent group may be positioned either o-, m- or p- with respect to the point of attachment of the phenyl ring with the basic nucleus. Similarly the anion A can be bromine, (lower)alkylsulfonate or arylsulfonate. Substituent X can be oxygen, sulfur and (lower)alkylimino; Y can be amino, mono- and di-(lower)alkylamino, K can be hydrogen, (lower)alkyl, and chlorophenyl. P can be hydrogen or (lower)alkyl; $n$ can range from 2 to 4. Compounds bearing the above-mentioned substituents possess substantially the same properties as those specifically claimed herein.

The intermediate carbazole-9-glyoxyloyl chlorides have the formula:

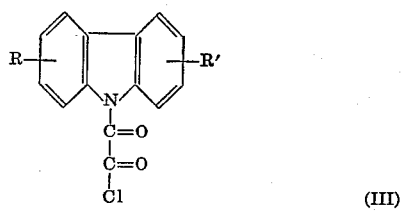

(III)

wherein R and R' are as above-defined.

The sequence of the reactions leading to the claimed compounds is illustrated as follows:

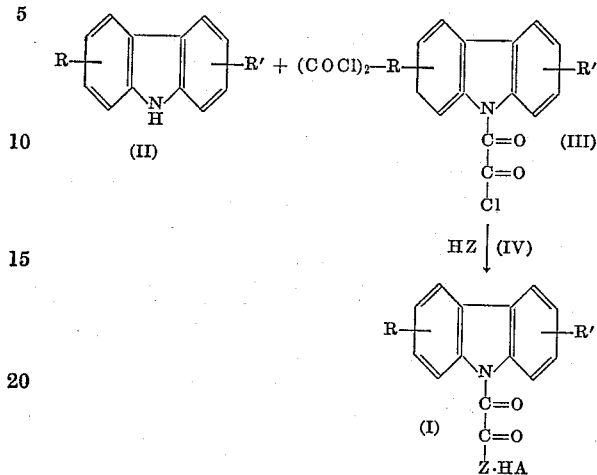

As shown in the accompanying flowsheet, the claimed compounds readily are prepared by reacting a carbazole (II) with oxalyl chloride to form the corresponding carbazole-9-glyoxyloyl chloride intermediate (III). The preparation of this intermediate conveniently is carried out by refluxing in an anhydrous solvent such as dry benzene one mole of carbazole with two moles of oxalyl chloride. After a suitable period of time, which is usually around 3 hours, the solvent and the excess oxalyl chloride are removed by vacuum distillation to give the intermediate carbazole-9-glyoxyloyl chloride (III). The final products are obtained by reacting this intermediate with an aminoalcohol, aminothiol, or a diamine, which are represented by Formula IV. This reaction is carried out by adding portionwise a solution of compound (IV) in a solvent such as tetrahydrofuran to a stirred solution of the intermediate (III) in a similar solvent. The product separates immediately and the reaction mixture is stirred for an additional half-hour to complete the reaction. The products can be recovered by filtering, washing with ether and drying. The claimed final products can be purified by recrystallization from lower alkanols. The claimed compounds, it will be noted from the accompanying examples, are usually isolated in the form of their hydrochlorides. They may be conventionally converted to their free form by treatment with base. Once in that form, they may be converted to their pharmaceutically acceptable acid addition salts by conventional treatment with organic or inorganic acids such as sulfuric acid, fumaric acid or maleic acid.

The following examples illustrate the specific procedures used in the making of a representative number of the compounds.

EXAMPLE 1

*Carbazole-9-glyoxyloyl chloride*

A mixture of carbazole (75.0 g., 0.448 m.) and oxalyl chloride (113.5 g., 0.896 m.) in dry benzene (250 ml.) is refluxed for three hours. The solvent and excess oxalyl chloride are removed by distillation in vacuo, affording a yellow oil which crystallizes; yield, 100.0 g. (87.0%). The crude product is recrystallized from methylene chloride-pentane, yellow prisms (80.3 g., 69.5%), M.P. 70.0–70.5° C. (uncorr.).

*Analysis.*—Calcd. for $C_{14}H_8ClNO_2$: C, 65.28; H, 3.13; N, 5.43. Found: C, 65.33; H, 3.09; N, 5.47.

EXAMPLE 2

*9 - [(4 - methyl - 1 - piperazinyl)glyoxyloyl]carbarzole hydrochloride*

A solution of 1-methylpiperazine (1.95 g., 0.0194 m.) in tetrahydrofuran (25 ml.) is added dropwise with stirring (magnetic) to a solution of carbazole-9-glyoxyloyl chloride (5.00 g., 0.0194 m.) in tetrahydrofuran (25 ml.). The product separates immediately as a colorless solid. The reaction mixture is refluxed for one-half hour to complete the reaction. After cooling, the crude product is collected by filtration, washed with anhydrous ether, dried at 50° C./house vac., yield, 5.46 g. (78.6%), M.P. 240.0–242.0° C. (uncorr.). The crude product is recrystallized from 2-propanol, yielding the title compound; colorless prisms, 4.1 g. (59.0%), M.P. 243.0–244.5° C. (uncorr.).

*Analysis.*—Calcd. for $C_{19}H_{20}ClN_3O_2$: C, 63.78; H, 5.63; N, 11.75. Found: C, 63.84; H, 6.02; N, 12.07.

EXAMPLE 3

*9 - [(4 - phenyl - 1 - piperazinyl)glyoxyloyl]carbazole*

In a manner similar to Example 2, N-phenylpiperazine (3.15 g., 0.0194 m.) is reacted with carbazole-9-glyoxyloyl chloride (5.00 g., 0.0194 m.) to give the title compound, 6.54 g. (80.3%). The crude product is recrystallized from absolute ethanol, then from 2-propanol, colorless needles (3.1 g., 38.0%), M.P. 188–189° C. (uncorr.).

*Analysis.*—Calcd. for $C_{24}H_{21}N_3O_2$: C, 75.17; H, 5.52; N, 10.96. Found: C, 75.05; H, 5.37; N, 10.63.

EXAMPLE 4

*Carbazole - 9 - glyoxylic acid, 1- methyl - 4 - piperidylester hydrochloride*

In a manner similar to Example 2, 4-hydroxy-1-methylpiperidine (2.20 g., 0.0194 m.) is reacted with carbazole-9-glyoxyloyl chloride (5.00 g., 0.0194 m.) to give the title compound, 6.56 g. (91.2%), M.P. 203–204° C. (uncorr.). The crude product is recrystallized from 2-propanol, colorless prisms, 5.3 g., M.P. 204.0–204.5° C. (uncorr.).

*Analysis.*—Calcd. for $C_{20}H_{20}ClN_2O_3$: C, 64.62; H, 5.42; N, 7.53. Found: C, 64.50; H, 5.68; N, 7.21.

EXAMPLE 5

*N - [2 - (dimethylamino)ethyl]carbazole - 9 - glyoxylamide hydrochloride*

The reaction of carbazole-9-glyoxyloyl chloride (5.00 g., 0.0194 m.) with N,N-dimethylethylenediamine (1.71 g., 0.0194 m.) in a manner similar to Example 2 gives the title compound (5.41 g., 50.6%), M.P. 177.5–179.0° C. (uncorr.). Recrystallization of the crude product from 2-propanol yields colorless prisms (2.60 g., 38.8%), M.P. 194.0–198.0° C. (uncorr.).

*Analysis.*—Calcd. for $C_{18}H_{20}ClN_3O_2$: C, 62.52; H, 5.83; N, 12.15. Found: C, 62.20; H, 6.05; N, 11.82.

The compounds of the present invention can be prepared and administered in a wide variety of oral and parenteral dosage forms, singly, or, in combination with other coacting compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as non-toxic alcohols, glycerine, or the like, may be thus used.

What is claimed is:

1. A carbazole compound selected from the group consisting of a compound having the formula:

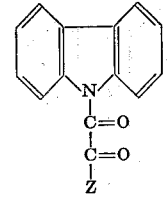

wherein Z represents a member of the group consisting of

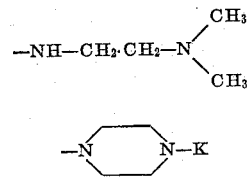

and

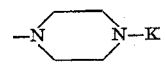

while K is a member of the group consisting of methyl and phenyl; and the pharmaceutically acceptable acid-addition salts thereof.

2. 9 - [(4 - methyl - 1 - piperazinyl)glyoxyloyl]carbazole.

3. 9 - [(4 - phenyl - 1 - piperazinyl)glyoxyloyl]carbazole.

4. N - [2 - (dimethylamino)ethyl]carbazole - 9 - glyoxylamide.

No references cited

ALEX MAZEL, *Primary Examiner.*

HENRY R. JILES, *Examiner.*